US011212806B2

(12) United States Patent
Liu et al.

(10) Patent No.: US 11,212,806 B2
(45) Date of Patent: Dec. 28, 2021

(54) NAN FINE-GRAINED AVAILABILITY SCHEDULE INDICATIONS

(71) Applicant: Apple Inc., Cupertino, CA (US)

(72) Inventors: Yong Liu, Campbell, CA (US); Christiaan A. Hartman, Mountain View, CA (US); Lawrie Kurian, San Jose, CA (US); Tashbeeb Haque, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 16/712,529

(22) Filed: Dec. 12, 2019

(65) Prior Publication Data
US 2020/0196299 A1 Jun. 18, 2020

Related U.S. Application Data

(60) Provisional application No. 62/780,024, filed on Dec. 14, 2018.

(51) Int. Cl.
H04J 3/00 (2006.01)
H04W 72/04 (2009.01)
H04L 29/06 (2006.01)
H04W 52/02 (2009.01)
H04W 72/08 (2009.01)

(52) U.S. Cl.
CPC ........... *H04W 72/048* (2013.01); *H04L 69/24* (2013.01); *H04W 52/0219* (2013.01); *H04W 72/0446* (2013.01); *H04W 72/085* (2013.01)

(58) Field of Classification Search
None
See application file for complete search history.

(56) References Cited

U.S. PATENT DOCUMENTS

| 7,450,577 | B2 | 11/2008 | Johansson |
| 8,614,964 | B1 | 12/2013 | Vargantwar |
| 10,075,754 | B2 | 9/2018 | Sheehan |
| 10,182,014 | B2 | 1/2019 | Bhandaru |
| 10,334,422 | B2 | 6/2019 | Abraham |

(Continued)

FOREIGN PATENT DOCUMENTS

EP  3 286 941 B1  9/2019

*Primary Examiner* — Phirin Sam
(74) *Attorney, Agent, or Firm* — Kowert, Hood, Munyon, Rankin & Goetzel, P.C.

(57) ABSTRACT

One or more wireless stations operate to configure direct communication with neighboring mobile stations, e.g., direct communication between the wireless stations without utilizing an intermediate access point. A wireless station may determine a further availability window schedule for a first time period, including specifying availability for particular channels at particular time slots at a first time slot increment. The wireless station may specify availability at a second time slot increment for a subset of the time slots specified at the first time slot increment. The second time slot increment may be less than the first slot time increment. The wireless station may negotiate, with a neighboring wireless station, a peer-to-peer communication schedule for the peer-to-peer communication application based on the further availability window schedule, including specifying a portion of the peer-to-peer schedule using the second time slot increment.

20 Claims, 19 Drawing Sheets

(56) References Cited

U.S. PATENT DOCUMENTS

| | | | |
|---|---|---|---|
| 2014/0325087 A1* | 10/2014 | Barreto | H04L 67/2804 |
| | | | 709/231 |
| 2016/0360446 A1* | 12/2016 | Wolf | H04L 47/30 |
| 2017/0094554 A1* | 3/2017 | Liu | H04W 8/005 |
| 2017/0346673 A1 | 11/2017 | Kneckt | |
| 2017/0366308 A1* | 12/2017 | Choi | H04W 72/14 |
| 2018/0183701 A1 | 6/2018 | Qi | |
| 2019/0020705 A1* | 1/2019 | Smadi | H04L 65/80 |
| 2019/0069310 A1* | 2/2019 | Brown | H04W 28/0289 |
| 2019/0082358 A1* | 3/2019 | Asterjadhi | H04W 72/1289 |
| 2019/0261206 A1* | 8/2019 | Gheorghiu | H04L 27/2666 |
| 2019/0363976 A1 | 11/2019 | Thubert | |
| 2021/0105789 A1* | 4/2021 | Freda | H04W 72/087 |

* cited by examiner

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

FIG. 4A

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

FIG. 4B

| Attributes | NAN SDF Frames ||||| 
|---|---|---|---|---|---|
| | Publish ||| Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

FIG. 4C

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

FIG. 4D

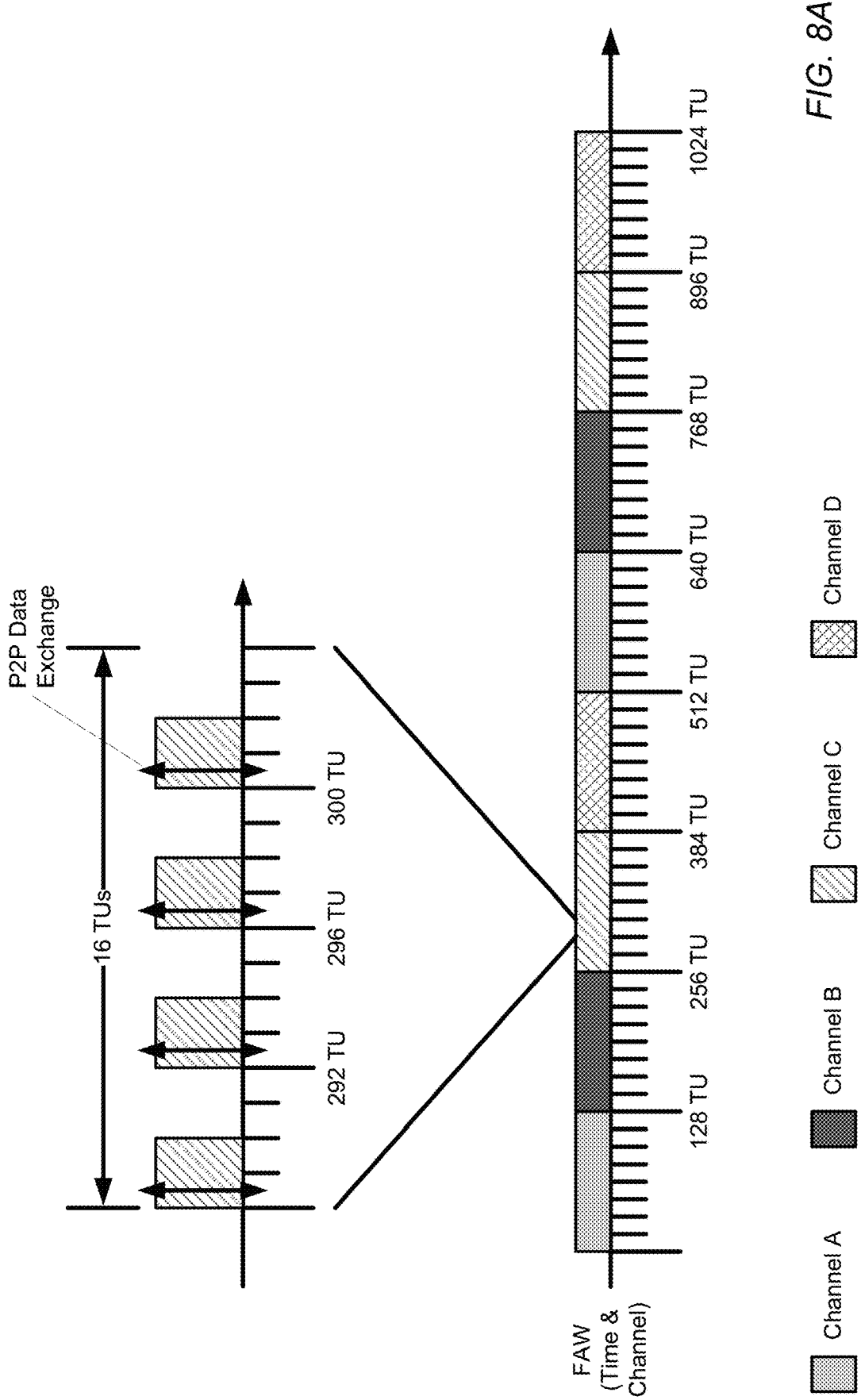

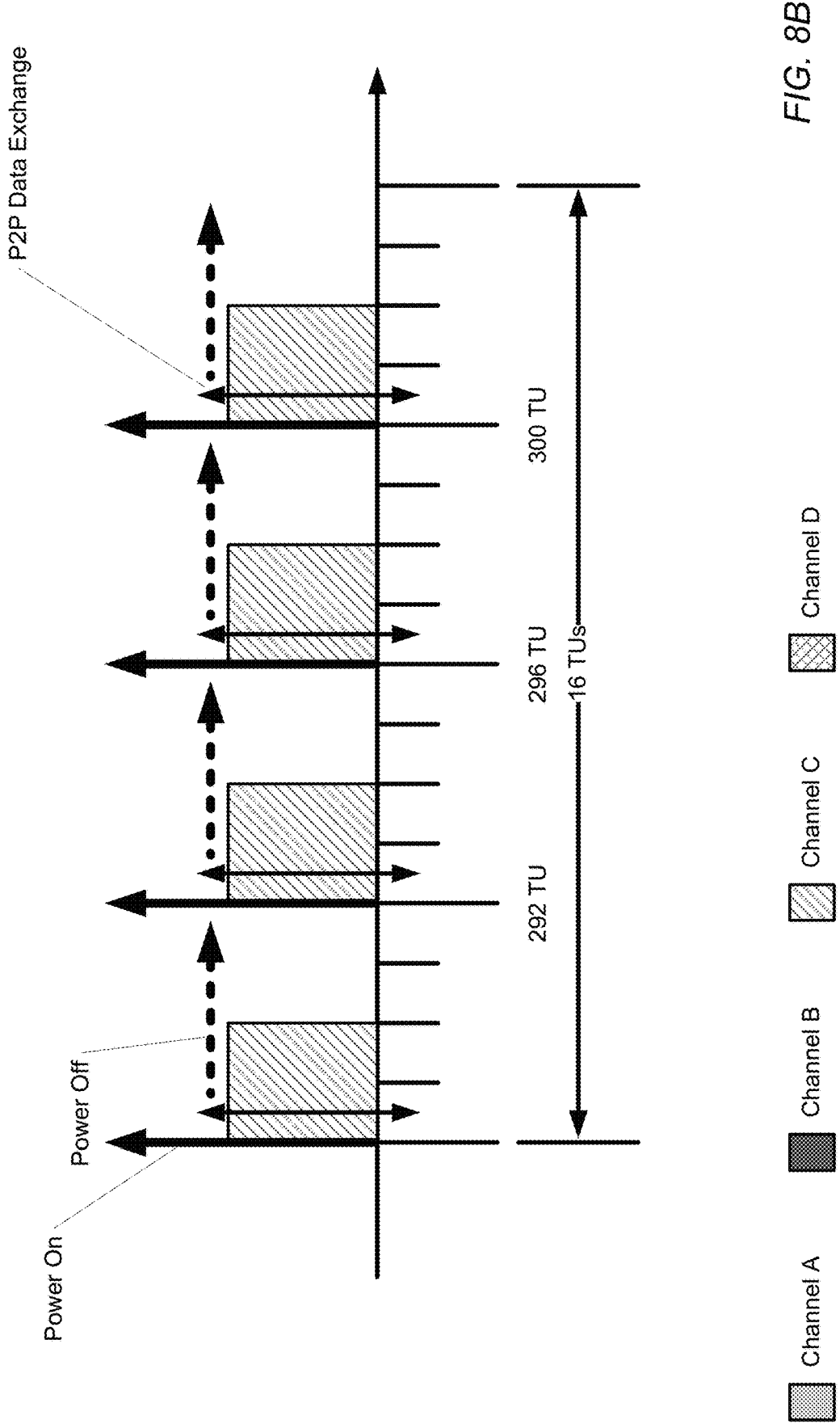

NAN FINE-GRAINED AVAILABILITY SCHEDULE INDICATIONS

PRIORITY DATA

This application claims benefit of priority to U.S. Provisional Application Ser. No. 62/780,024, titled "NAN Fine-Grained Availability Schedule Indications", filed Dec. 14, 2018, by Yong Liu, Christiaan A. Hartman, Lawrie Kurian, and Tashbeeb Haque, which is hereby incorporated by reference in its entirety as though fully and completely set forth herein.

FIELD

The present application relates to wireless communications, including techniques for scheduling wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to advertise availability in support of low-latency services.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to accelerate discovery of one another (e.g., as compared to typical discovery processes) after an out-of-band triggering of service discovery.

In some embodiments, the communications may be performed via a peer-to-peer wireless communications protocol such as Neighbor Awareness Networking (NAN). Thus, embodiments of the disclosure also relate to NAN devices advertising availability in support of low-latency services (e.g., as compared to typical NAN availability advertising).

In some embodiments, a wireless station may be configured to perform a method to advertise availability at different granularities of time slot increments. For example, in some embodiments, a wireless device may perform a method for peer-to-peer communication scheduling. The method may include the wireless device determining, for peer-to-peer communications, a further availability window schedule for a first time period, including specifying availability for particular channels at particular time slots at a first time slot increment. The wireless device may specify availability at a second time slot increment for at least a subset of the time slots specified at the first time slot increment. The second time slot increment may be less than the first slot time increment. The wireless device may negotiate, with at least a first neighboring wireless station, a peer-to-peer communication schedule for the peer-to-peer communication application based on the further availability window schedule, including specifying at least a portion of the peer-to-peer schedule using the second time slot increment and communicate, with at least the first neighboring wireless station, according to the negotiated peer-to-peer communication schedule. In some embodiments, the first time slot increment may include 16 time units. In some embodiments, the second time slot increment may include at least one of 1 time unit, 2 time units, 4 time units, or 8 time units. In some embodiments, a time unit may be 1.024 milliseconds.

In some embodiments, a wireless station may be configured to perform a method to advertise availability at different granularities of time slot increments in support of low-latency services (e.g., such as peer-to-peer applications). For example, in some embodiments, a wireless device may perform a method for peer-to-peer communication scheduling. The method may include the wireless device determining, for peer-to-peer communications, a further availability window schedule for a first time period, including specifying availability for particular channels at particular time slots at a first time slot increment. The wireless device may also determine, based at least in part on latency requirements of a peer-to-peer communication application, to further specify availability at a second time slot increment for at least a subset of the time slots specified at the first time slot increment. The second time slot increment may be less than the first slot time increment. The wireless device may negotiate, with at least a first neighboring wireless station, a peer-to-peer communication schedule for the peer-to-peer communication application based on the further availability window schedule, including specifying at least a portion of the peer-to-peer schedule using the second time slot increment and communicate, with at least the first neighboring wireless station, according to the negotiated peer-to-peer communication schedule. In some embodiments, the first time slot increment may include 16 time units. In some embodiments, the second time slot increment may include at least one of 1 time unit, 2 time units, 4 time units, or 8 time units. In some embodiments, a time unit may be 1.024 milliseconds.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments.

FIG. 4D illustrates an example format of an action frame, according to some embodiments.

FIGS. 8A and 8B illustrate examples of P2P data exchanges permitted by a fine-grained availability window schedule, according to some embodiments.

DETAILED DESCRIPTION

Acronyms

Figure 1:
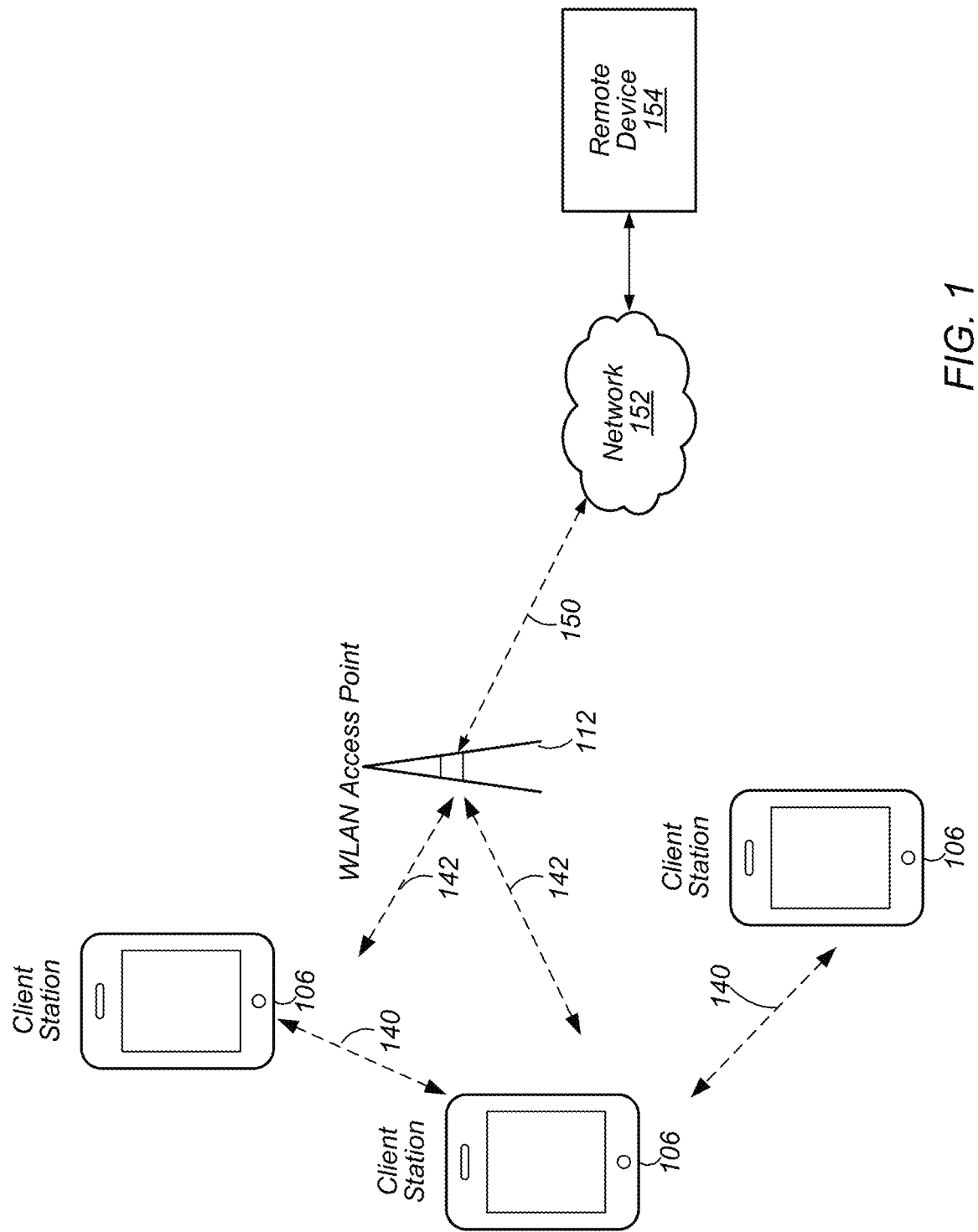
FIG. 1 illustrates an example WLAN communication system, according to some embodiments.

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium —Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network. BLUETOOTH™—The term "BLUETOOTH™" has the full breadth of its ordinary meaning, and at least includes any of the various implementations of the Bluetooth standard, including Bluetooth Low Energy (BTLE)

and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short to medium range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to schedule peer-to-peer communications. For example, wireless device 106 may determine, for peer-to-peer communications, a further availability window schedule for a first time period, including specifying availability for particular channels at particular time slots at a first time slot increment. The wireless device 106 may specify availability at a second time slot increment for at least a subset of the time slots specified at the first time slot increment. The second time slot increment may be less than the first slot time increment. The wireless device 106 may negotiate, with at least a first neighboring wireless station, a peer-to-peer communication schedule for the peer-to-peer communication application based on the further availability window schedule, including specifying at least a portion of the peer-to-peer schedule using the second time slot increment and communicate, with at least the first neighboring wireless station, according to the negotiated peer-to-peer communication schedule. In some embodiments, the first time slot increment may include 16 time units. In some embodiments, the second time slot increment may include at least one of 1 time unit, 2 time units, 4 time units, or 8 time units. In some embodiments, a time unit may be 1.024 milliseconds.

Figure 2:
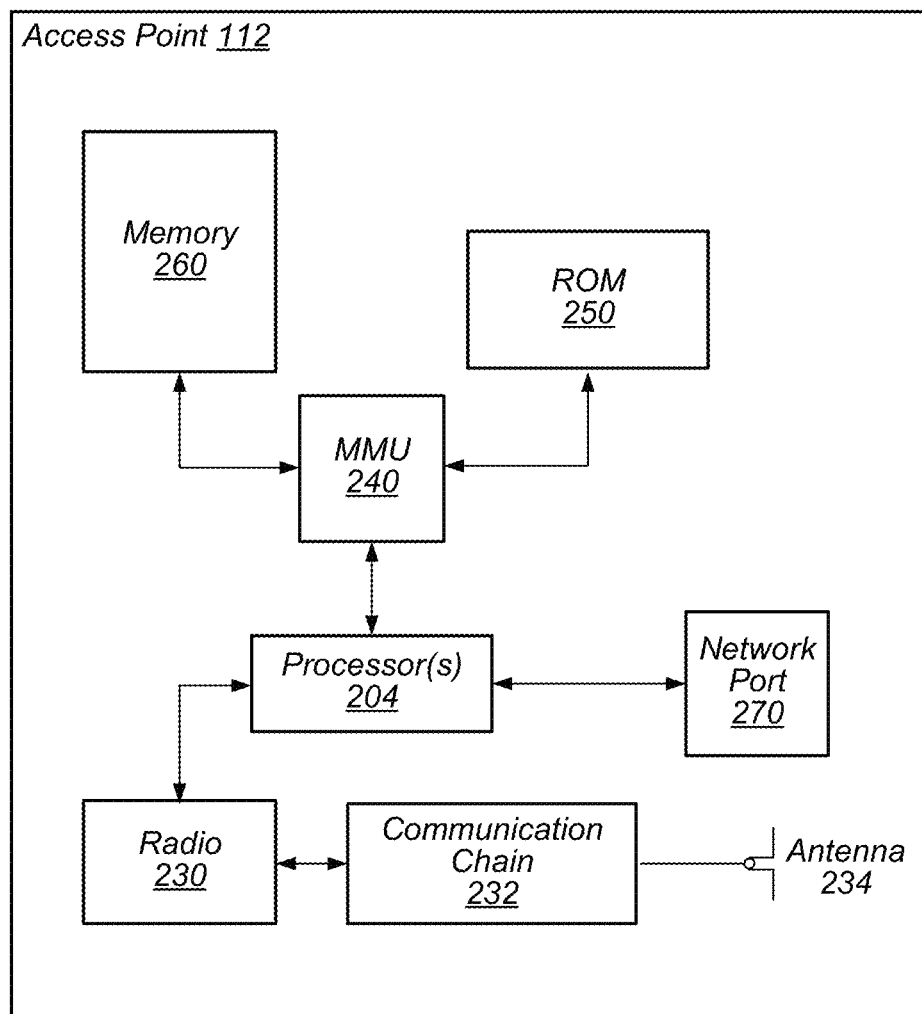
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to schedule peer-to-peer communications. For example, AP 112 may determine, for peer-to-peer communications, a further availability window schedule for a first time period, including specifying availability for particular channels at particular time slots at a first time slot increment. The AP 112 may specify availability at a second time slot increment for at least a subset of the time slots specified at the first time slot increment. The second time slot increment may be less than the first slot time increment. The AP 112 may negotiate, with at least a first neighboring wireless station, a peer-to-peer communication schedule for the peer-to-peer communication application based on the further availability window schedule, including specifying at least a portion of the peer-to-peer schedule using the second time slot increment and communicate, with at least the first neighboring wireless station, according to the negotiated peer-to-peer communication schedule. In some embodiments, the first time slot increment may include 16 time units. In some embodiments, the second time slot increment may include at least one of 1 time unit, 2 time units, 4 time units, or 8 time units. In some embodiments, a time unit may be 1.024 milliseconds.

Figure 3:
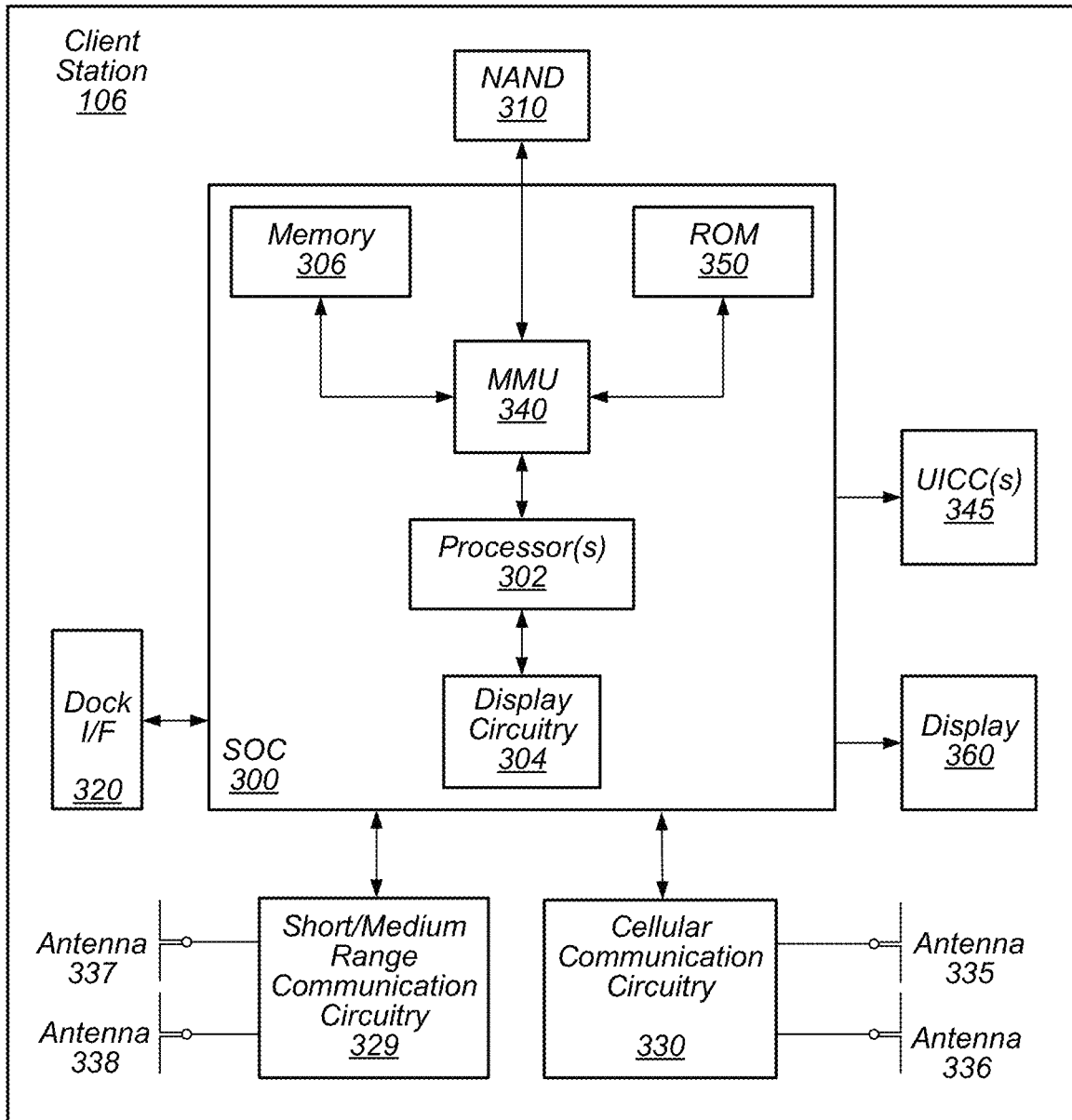
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short to medium range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to schedule peer-to-peer communications. For example, client station 106 may determine, for peer-to-peer communications, a further availability window schedule for a first time period, including specifying availability for particular channels at particular time slots at a first time slot increment. The client station 106 may specify availability at a second time slot increment for at least a subset of the time slots specified at the first time slot increment. The second time slot increment may be less than the first slot time increment. The client station 106 may negotiate, with at least a first neighboring wireless station, a peer-to-peer communication schedule for the peer-to-peer communication application based on the further availability window schedule, including specifying at least a portion of the peer-to-peer schedule using the second time slot increment and communicate, with at least the first neighboring wireless station, according to the negotiated peer-to-peer communication schedule. In some embodiments, the first time slot increment may include 16 time units. In some embodiments, the second time slot increment may include at least one of 1 time unit, 2 time units, 4 time units, or 8 time units. In some embodiments, a time unit may be 1.024 milliseconds.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short to medium range wireless communication circuitry 329 may each include one or more processing elements. In other words, one or more processing elements may be included in cellular communication circuitry 330 and also in short to medium range wireless communication circuitry 329. Thus, each of cellular communication circuitry 330 and short to medium range wireless communication circuitry 329 may include one or more integrated circuits (ICs) that are configured to perform the functions of cellular communication circuitry 330 and short to medium range wireless communication circuitry 329, respectively. In addition, each integrated circuit may include circuitry (e.g., first circuitry, second circuitry, etc.) configured to perform the functions of cellular communication circuitry 330 and short to medium range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 2.0 and later versions of NAN) may include fields such as a frame control (FC) filed, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 2.0 and later versions of NAN) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 2.0 and later versions of NAN) includes multiple fields that may be used to implement features of embodiments disclosed herein. For example, in some embodiments, information associated with embodiments disclosed herein may be transported via any of (or any combination of) attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or included) different attributes based on a type of NAN SDF frame. For example, a publish SDF frame for data transmission may include both mandatory (M) and optional (O) attributes that differ from a publish SDF frame for ranging and/or other purposes (e.g., "Otherwise"). Similarly, a subscribe SDF frame may include differing attributes as compared to a follow-up SDF and/or the various publish SDF frames. Thus, as a further example, various configurations of a NAN attribute may be used to transport information associated with embodiments disclosed herein.

As yet a further example, as illustrated by FIG. 4D, an action frame format (e.g., as specified by NAN 2.0 and later versions of NAN) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window, they may exchange synchronization packets to stay synchronized with each other. The wireless stations may also use the discovery window to exchange service discovery frames to convey other information such as further availability beyond discovery windows.

The NAN protocol initially included two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, per NAN 2.0, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Additionally, datapath resource allocation relates to two peer wireless stations communicating with each other regarding a common time slot and channel for communication. In other words, the two devices communicate with each other regarding which channel they should use and at which time slot, to help ensure proper communication between them. In addition, the two devices communicate with each other regarding which channel and time slot each would prefer to use for future communications between the devices.

NAN 3.0 introduces TCP/IP support for NAN as well as out-of-band (e.g., Bluetooth and/or Bluetooth Low Energy) triggering of NAN discovery. In particular, NAN 3.0 will introduce support of NAN service discovery over lower energy wireless interfaces. Thus, wireless stations will be enabled to advertise and/or seek NAN services over the lower energy wireless interfaces. NAN 4.0 will further introduce near field communication (NFC) triggering for NAN. Embodiments described herein further define methods (and/or mechanisms) for a wireless station (including, but not limited to, a NAN device) to specify further availability window schedules in increments of less than 16 time units, where a time unit may be 1.024 milliseconds.

Fine-Grained Availability Schedule Indications

Figure 5:
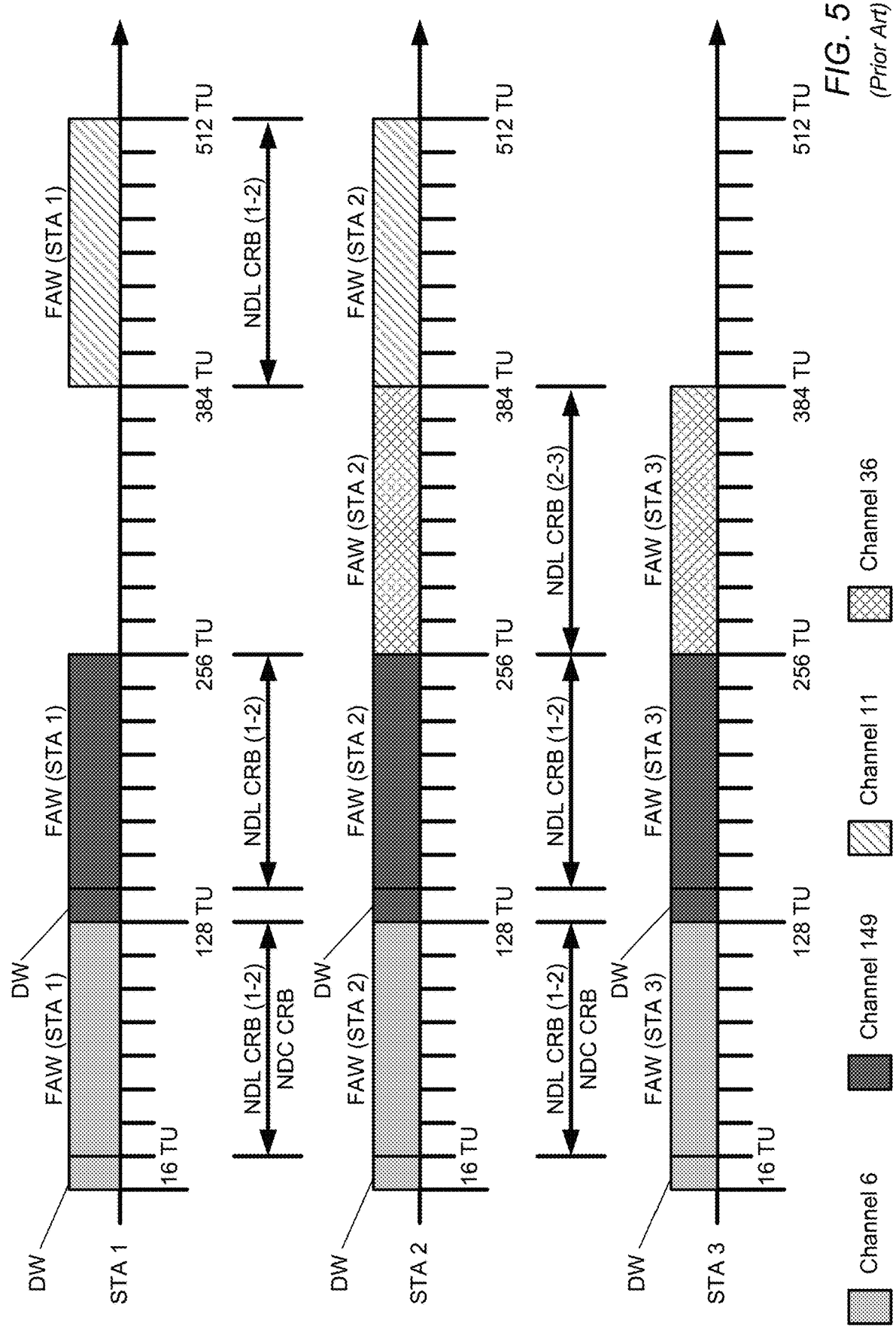
FIG. 5 illustrates an example of NAN communications between devices.

Existing implementations of NAN (e.g., NAN 1.0 and/or NAN 2.0) enable many device-to-device (or peer-to-peer) direct communication applications and additionally allow devices to advertise availability schedules for scheduling of future (subsequent) communications. For example, FIG. 5 illustrates an example of NAN communications between devices., As shown. devices (e.g., STA 1, STA 2, and STA 3) may advertise and schedule NAN communications based on discovery windows (DWs) and further availability windows (FAWs). A DW may be a standard specified periodical time window on a NAN discovery channel (e.g., such as channel 6) in which NAN devices may maintain time synchronization and/or conduct service discovery (e.g., via exchange/sharing of synchronization and/or discovery beacons). A FAW may be a device selected time window on a specified channel (e.g., such as channels 6, 11, 36, 149, and/or various other channels) in which the device may be available to receive NAN transmissions beyond DWs. In addition, a NAN data link (NDL) common resource block (CRB) may be defined as overlapping FAWs between a device pair in which devices within the device pair may exchange data (e.g., such as NDL CRB (1-2) and/or NDL CRB (2-3)). Further, a NAN data cluster (NDC) CRB may be defined as overlapping FAWs between all devices within a NAN cluster in which devices within the NAN cluster may communication with all other devices within the NAN cluster. For example, as illustrated by FIG. 5, STAs 1, 2, and 3 may all be available for DWs as well as certain FAWs, such as shown for channels 6 and 149. In addition, STAs 2 and 3 may have common availability for communications, such as shown for channel 36.

Figure 6A:
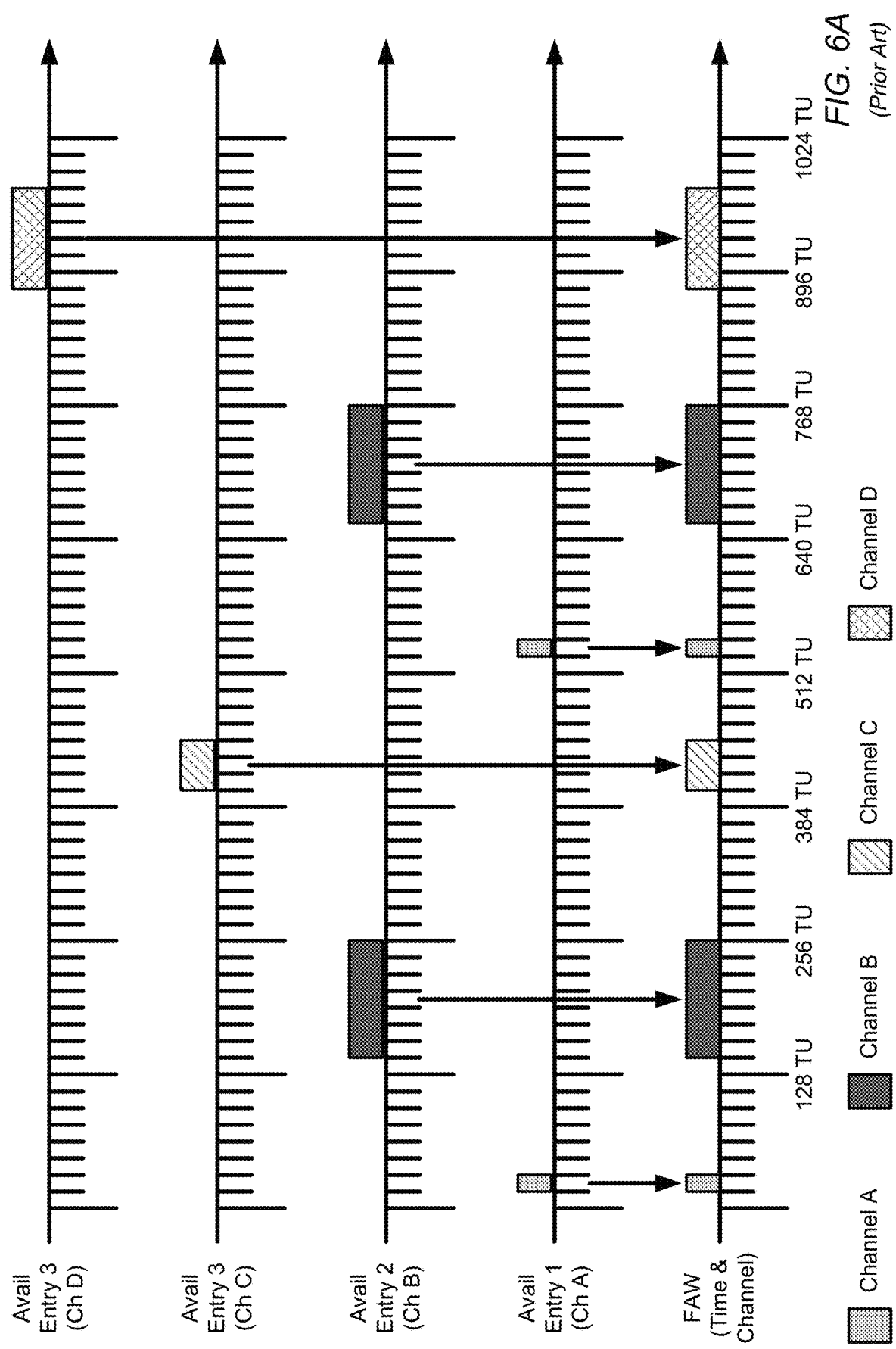
FIG. 6A illustrates an example of a further availability window schedule, including bitmaps for visited channels.
Figure 6B:
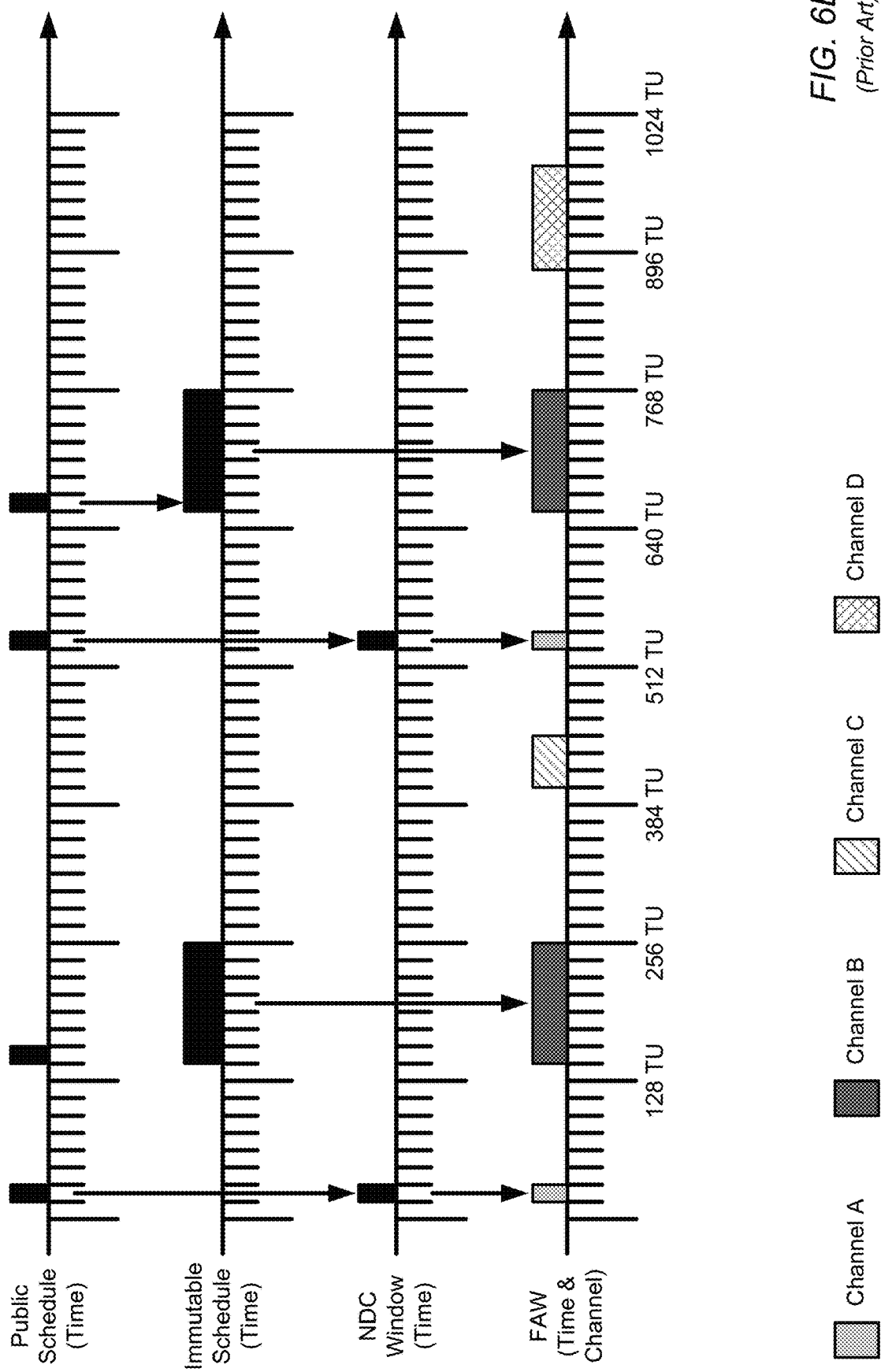
FIG. 6B illustrates an example of a further availability window schedule, including bitmaps for various time schedules.

In some implementations, each NAN further availability window schedule indication may include a time bitmap and a specific channel. For example, FIG. 6A illustrates an example of a further availability window schedule, including bitmaps for visited channels. As shown, a device may build its further availability window (FAW) schedule by combining availability times on each channel (e.g., such as channels A, B, C, and/or D, each of which may be any channel suitable for peer-to-peer communications) the device plans to occupy during a further availability window. Note that further availability may only be specified in increments of 16 time units (TUs), where a TU is 1.024 milliseconds or 1024 microseconds. In addition, multiple NAN operational schedules may be subsets of the further availability window schedule. For example, FIG. 6B illustrates an example of a further availability window schedule, including bitmaps for various time schedules. As shown, various schedules may be specified as time windows and refer back to the FAW schedule for channel information. Thus, the NAN operational schedules only need to specify availability time slots while referring to the further availability window schedule for operation channel information. For example, a public schedule, which may include non-cancellable time windows, may indicate device availability during time windows and refer back to the FAW schedule for channel information. Additionally, an immutable schedule, which may include time windows that are unable to be changed and/or do not change over time, may indicate device availability during time windows and refer back to the FAW schedule for channel information. Further, a NAN data cluster schedule, which may indicate device availability for communications associated with a NAN data cluster, may indicate device availability during time windows and refer back to the FAW schedule for channel information.

Figure 7:
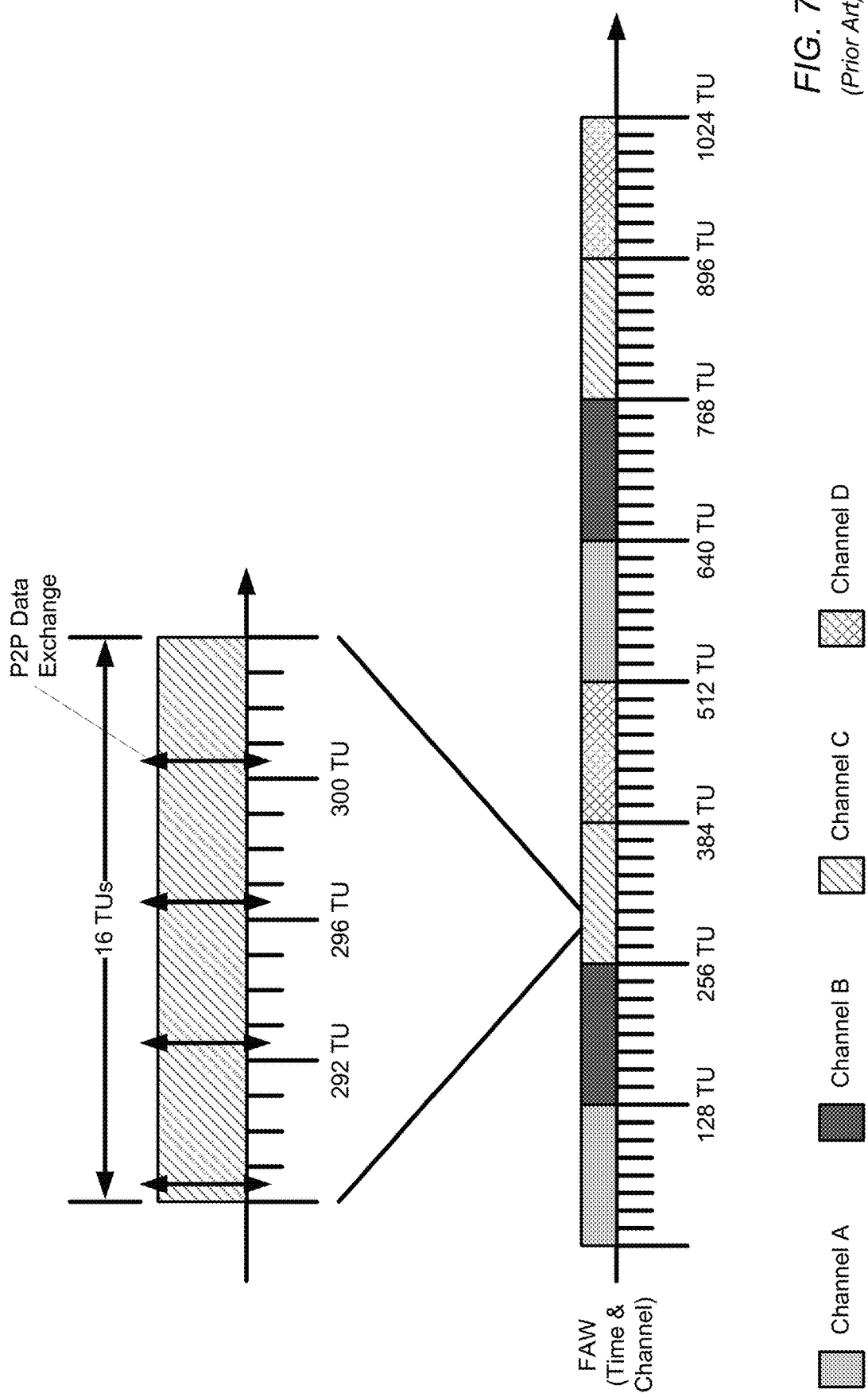
FIG. 7 illustrates an example of a further availability window schedule for a low latency application.

However, some services (or applications) require extremely low latency for Wi-Fi peer-to-peer communication. For example, a gaming application may require a latency on the order of 2 to 5 milliseconds and an audio application may require a latency on the order of 10 milliseconds, both of which are less than the minimum time unit (16 TUs) devices can use to indicate availability. Thus, to support applications with latency requirements of less than 16 TU (~16.4 milliseconds), a device may need to be available for an entire 16 TU window although an application may only need to communicate a small amount of data every few time units. For example, FIG. 7 illustrates an example of a further availability window schedule for such an application, e.g. in which the device may need to communicate (e.g., perform a P2P data exchange every 4 or 8 TUs. Further, if an application maintains communication for long periods (e.g., hours), a significant power burden may be placed on battery operated devices. Note that although some dynamic power saving schemes can be used to enable a NAN device pair to enter power-saving mode when there is no more data to exchange for a current time slot, the earliest time to exit the power-savings mode is the next 16 TU boundary which may cause long delays for low latency applications.

Embodiments described herein provide mechanisms for devices to specify further availability window schedules in increments of less than 16 TUs. For example, embodiments described herein may allow for specification of availability schedules in increments of 2 TUs, although other increments are possible (e.g., 1 TU, 4 TUs, 8 TUs, and so forth). In some embodiments, as illustrated by FIGS. 8A and 8B, a fine-grained availability (FGA) schedule may include a series of 16 TU FGA slots. The series of 16 TU FGA slots may be repeated every 512 TU (e.g., every discovery window interval) or over multiple 512 TUs. For example, as shown, a wireless device's (e.g., such as client station 106) FAW schedule may include 100% availability with the wireless device scheduled to switch channels (e.g., from channel A to channel B, from channel B to channel C, from channel C to channel D, and from channel D to channel A, where each of channels A, B, C, and/or D may be any channel suitable for peer-to-peer communications). In some embodiments, a 16 TU FGA slot may be sub-divided into sub-slots, such as in 2 TU increments, e.g., 8 sub-slots per FGA slot.

In some embodiments, an FGA schedule may allow a wireless device, such as client station 106, to wake up at a beginning of a sub-slot that it indicates to be available and make use of an early portion of the sub-slot to complete data exchanges with one or multiple peers. Then, once the data exchange is over (e.g., has been completed for the current time interval), the device may enter a power saving mode until a beginning of a next availability sub-slot. For example, FIGS. 8A and 8B illustrate examples of P2P data exchanges permitted by a fine-grained availability window schedule, according to some embodiments. As shown, an FGA schedule may include availability in every other time slot, thereby allowing data exchange every 4 TUs while enabling the wireless device to power off after the data exchange. In other words, each FGA slot may be a "cancelable" availability slot, meaning a device may not be required to be available for the entire FGA slot. Thus, although the FAW schedule show 100% availability in every second time slot, the wireless device may still employ power saving opportunities while servicing low latency data exchanges.

Figure 9:
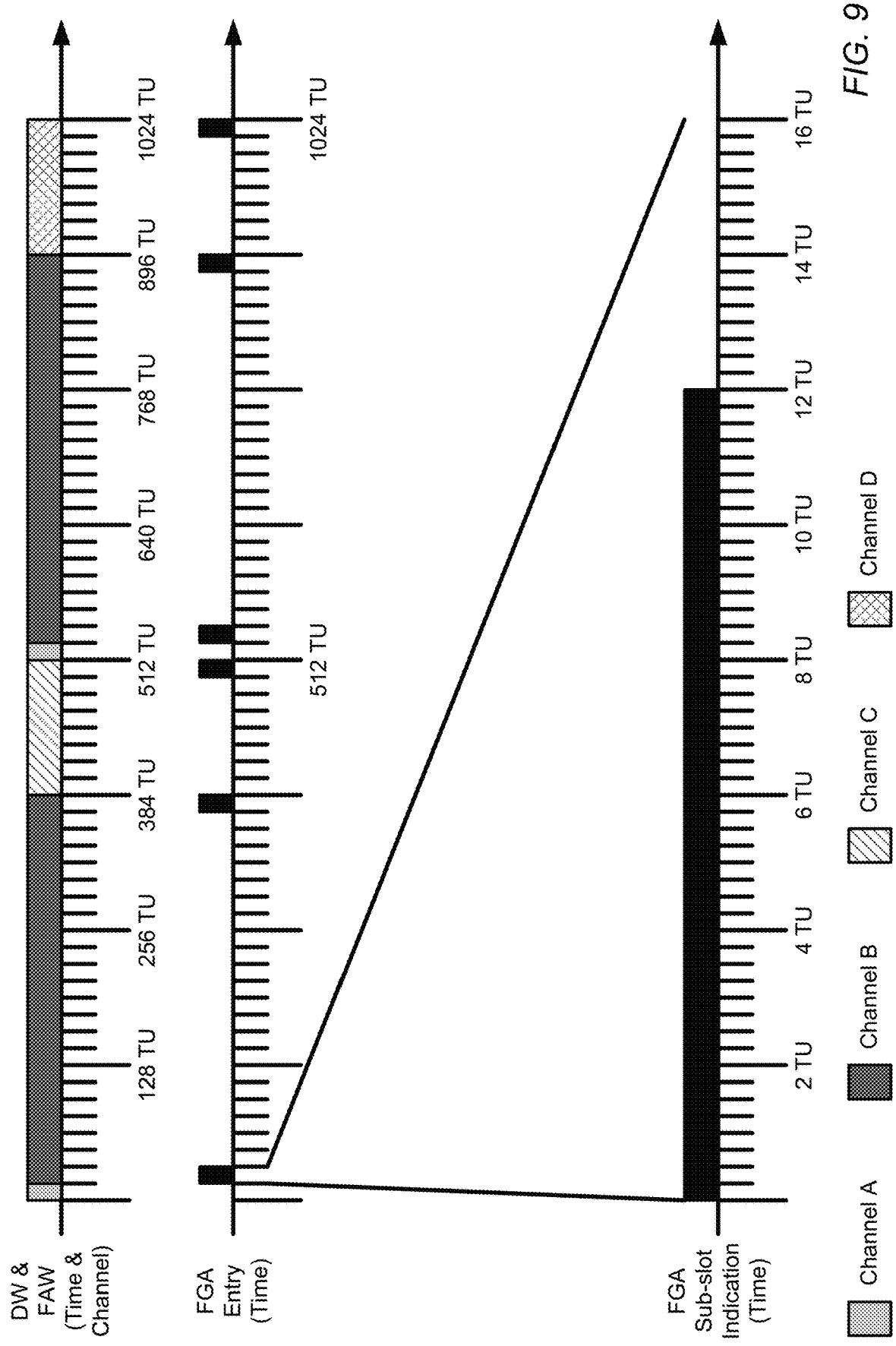
FIG. 9 illustrates an example of a fine-grained availability window schedule for supporting (and/or accommodating) band/channel switches, according to some embodiments.

In some embodiments, a band/channel switch (e.g., from a 2.4 GHz band to a 5 GHz band or visa-versa and/or from one channel to another channel, inter-band and/or intra-band) may require multiple TUs, during which time a wireless device (e.g., such as client station 106) may be unavailable for data communications. For example, FIG. 9 illustrates an example of a fine-grained availability window schedule for supporting (and/or accommodating) band/channel switches, according to some embodiments. As shown, a wireless device, such as client station 106 may schedule an FGA slot immediately before each scheduled channel switch. Alternatively, or in addition, a flag (included in an availability indication) may be used to indicate such placement of the FGA slot. In some embodiments, within a sub-slot availability indication, a last one or multiple sub-slots (e.g., occurring at the end of an FGA slot) may be indicated as non-available as shown, thus allowing the wireless device to switch to another band/channel.

Figure 10:
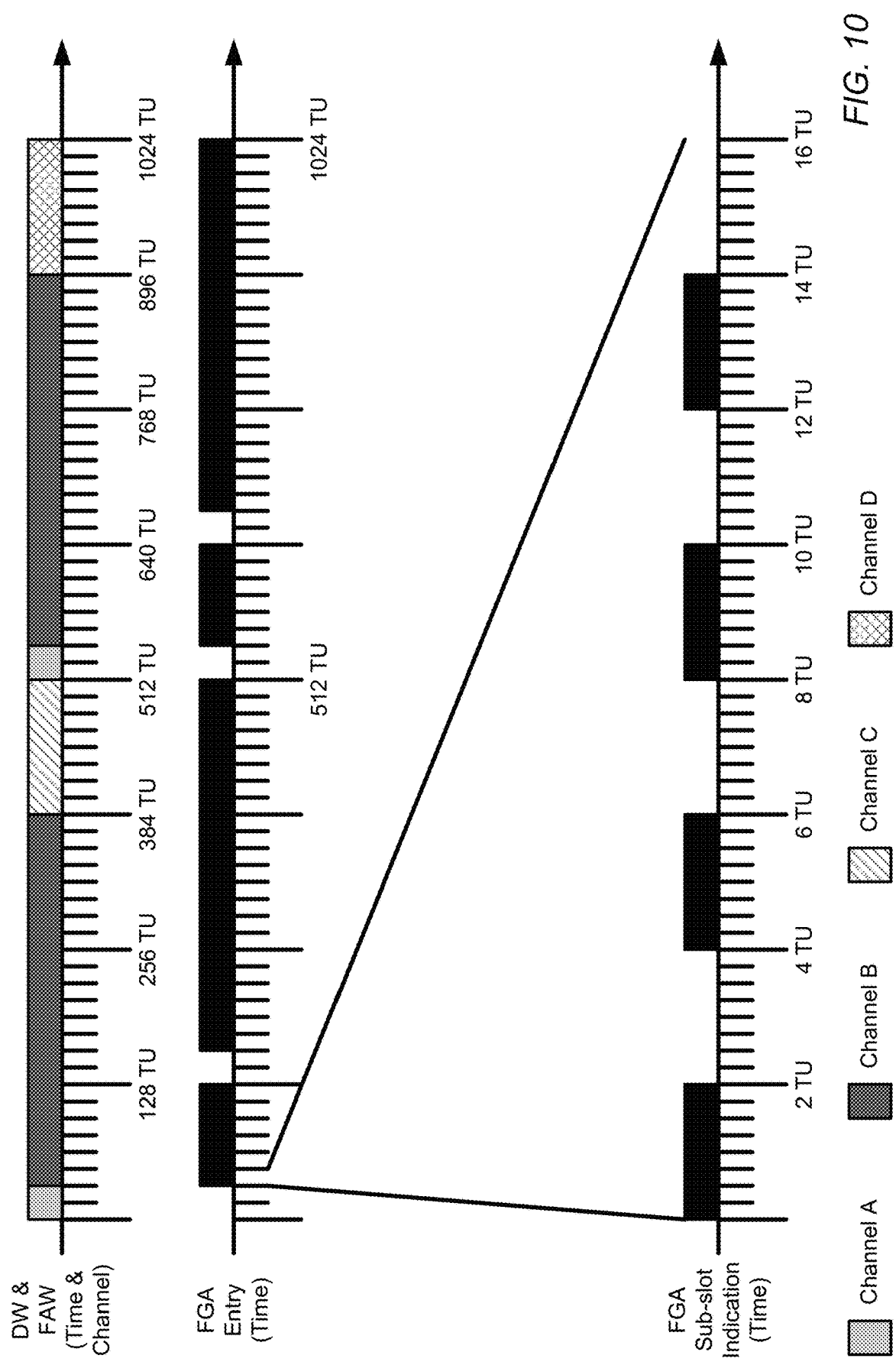
FIG. 10 illustrates an example of a fine-grained availability window schedule for supporting (and/or accommodating) a low latency requirement for an application, according to some embodiments.

In some embodiments, an FGA slot schedule may be a subset of a further availability window schedule. For example, FIG. 10 illustrates an example of a fine-grained availability window schedule for supporting (and/or accommodating) a low latency requirement for an application, according to some embodiments. In some embodiments, an indication of an FGA schedule may include a time-slot bitmap and a sub-slot availability indication. The time-slot bitmap may indicate FGA slots within a further availability window schedule, e.g., similar to data cluster schedule, immutable schedule, and/or public schedule indications. In other words, the time-slot bitmap may only indicate timing and not channel. In some embodiments, the channel corresponding to each FGA slot may refer to the corresponding further availability window schedule. In some embodiments, a channel/frequency switch may only occur at 16 TU slot boundaries. In some embodiments, the sub-slot availability indication may indicate sub-slot availability within each FGA slot. In some embodiments, all FGA slots may share a common sub-slot availability indication. In some embodiments, a 2-bit indication may be used for indicating sub-slot availability. For example, the 2-bit indication may specify the available sub-slot intervals: 0, 2, 4, 8, respectively. In other words, available at the beginning of every sub-slot (0 or 00), every two sub-slots (1 or 01), every 4 sub-slots (2 or 10), or every 8 sub-slots (3 or 11). In some embodiments, an 8-bit bitmap may be used for indicating sub-slot availability. For example, each individual sub-slot may be specified as available or unavailable. Thus, for example, the FGA sub-slot indication as illustrated by FIG. 10 may be 10101010 and/or 01010101 depending on convention.

Figure 11:
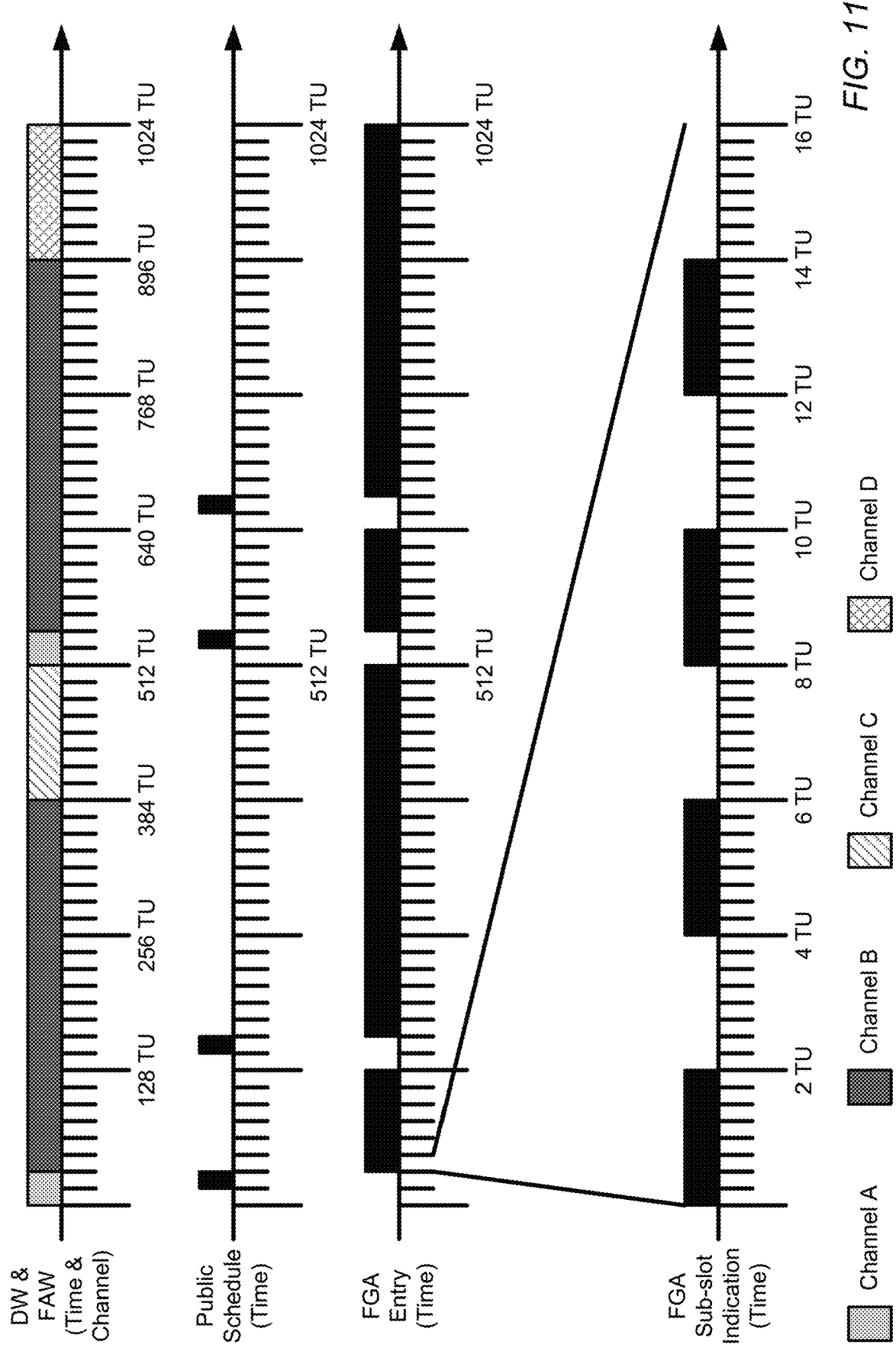
FIG. 11 illustrates an example of a fine-grained availability window schedule for supporting (and/or accommodating) low latency requirement for an application along with a non-cancellable public availability schedule, according to some embodiments.

In some embodiments an FGA schedule may be mutually exclusive with a public (non-cancelable) schedule and committed discovery windows, e.g., due to FGA slots being cancelable. For example, FIG. 11 illustrates an example of a fine-grained availability window schedule for supporting (and/or accommodating) low latency requirement for an application along with a non-cancellable public availability schedule, according to some embodiments. As shown, if an FGA time-slot overlaps with a public time-slot and/or a committed discovery window time-slot, the public time-slot and/or the committed discovery window time-slot may overwrite the FGA time-slot. In other words, a wireless device (e.g., such as client station 106) may be available during the entire 16 TU time-slot irrespective of the FGA sub-slot schedule. In some embodiments, to further simplify FGA time-slot indications, flags may be used to indicate that an FGA slot schedule covers all time slots and/or or the FGA slot schedule is the same as the further availability window schedule, except for the fully-available time-slots indicated by other schedules (such as committed discovery windows and/or public schedule). Alternatively, in some embodiments FGA sub-slots may be set to cancelable or non-cancelable to allow more flexible indications. For example, for a cancelable sub-slot, the device may be available at the beginning of the sub-slot, but may enter power saving mode once data exchange has been completed, e.g., as described above. However, for a non-cancelable sub-slot, the device may be available during the entire sub-slot.

Figure 12A:
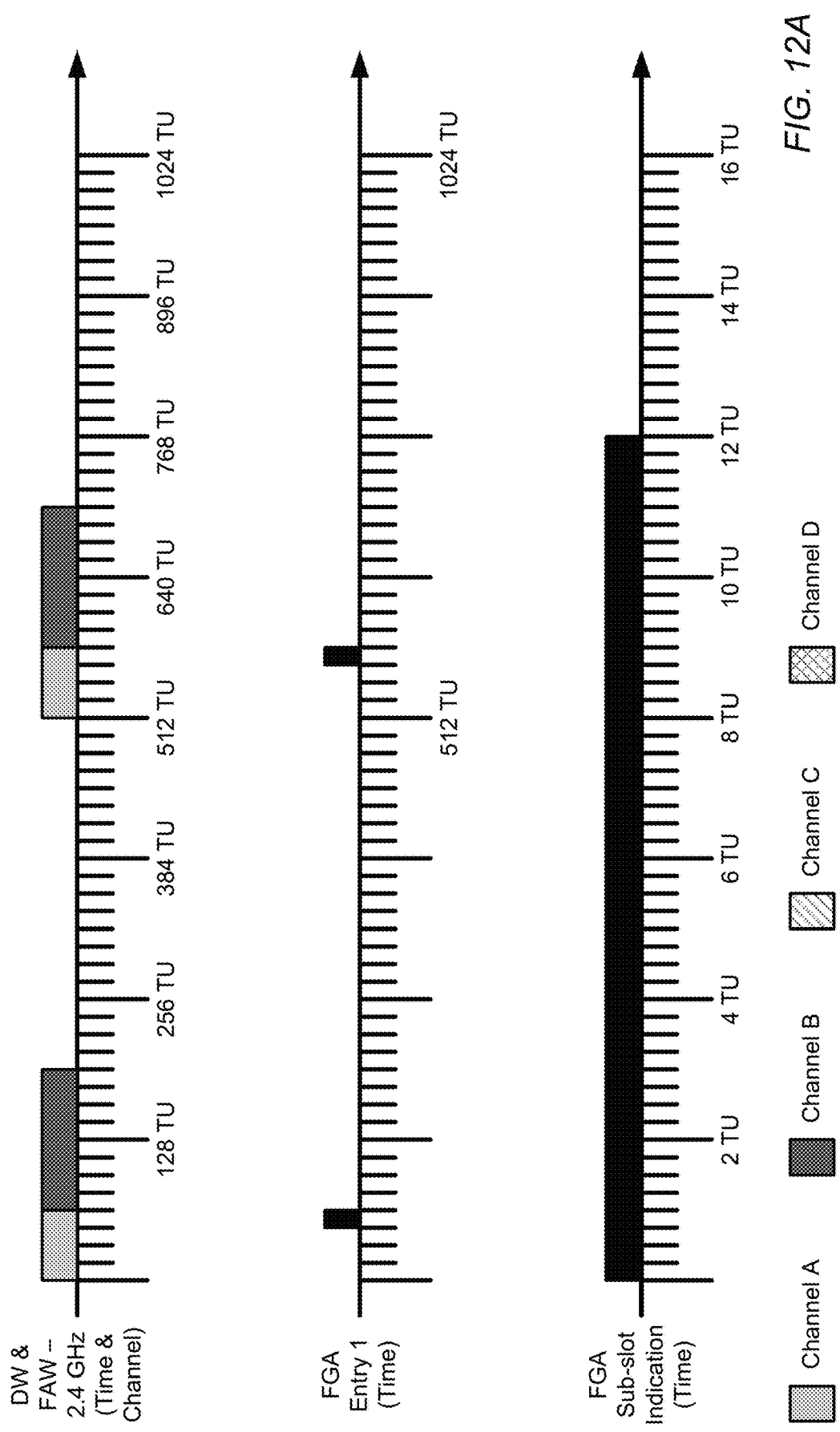
FIGS. 12A and 12B illustrate examples of fine-grained availability window schedules for supporting multiple bands, according to some embodiments.
Figure 12B:
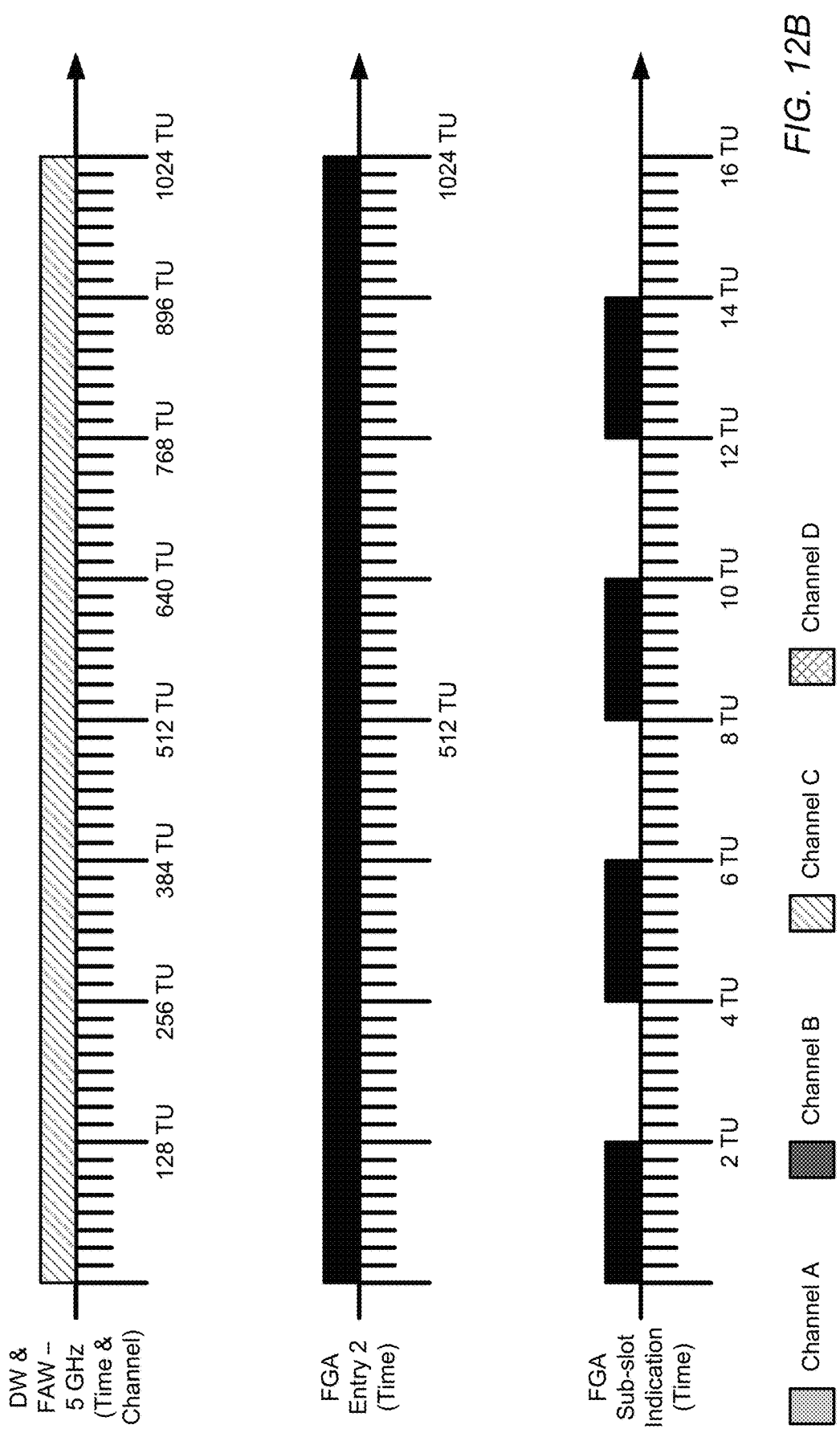

In some embodiments, multiple FGA schedule indications (or entries) may be used to indicate different FGA slot schedules associated with different further availability window schedule maps (e.g., different maps used to indicate availability for different radios) and/or to indicate different sets of FGA slot schedules with different sub-slot availability patterns. Note that in some embodiments, each FGA slot schedule may have a corresponding time-slot bitmap and/or sub-slot availability indication. For example, FIGS. 12A and 12B illustrate examples of fine-grained availability window schedules for supporting multiple bands, according to some embodiments. As shown in FIGS. 12A and 12B, a wireless device, such as client station 106, may have a FAW schedule for both a 2.4 GHz band and a 5 GHz band. Thus, the wireless device may also have a corresponding FGA entry (slot schedule) and sub-slot indication for each band.

Figure 13:
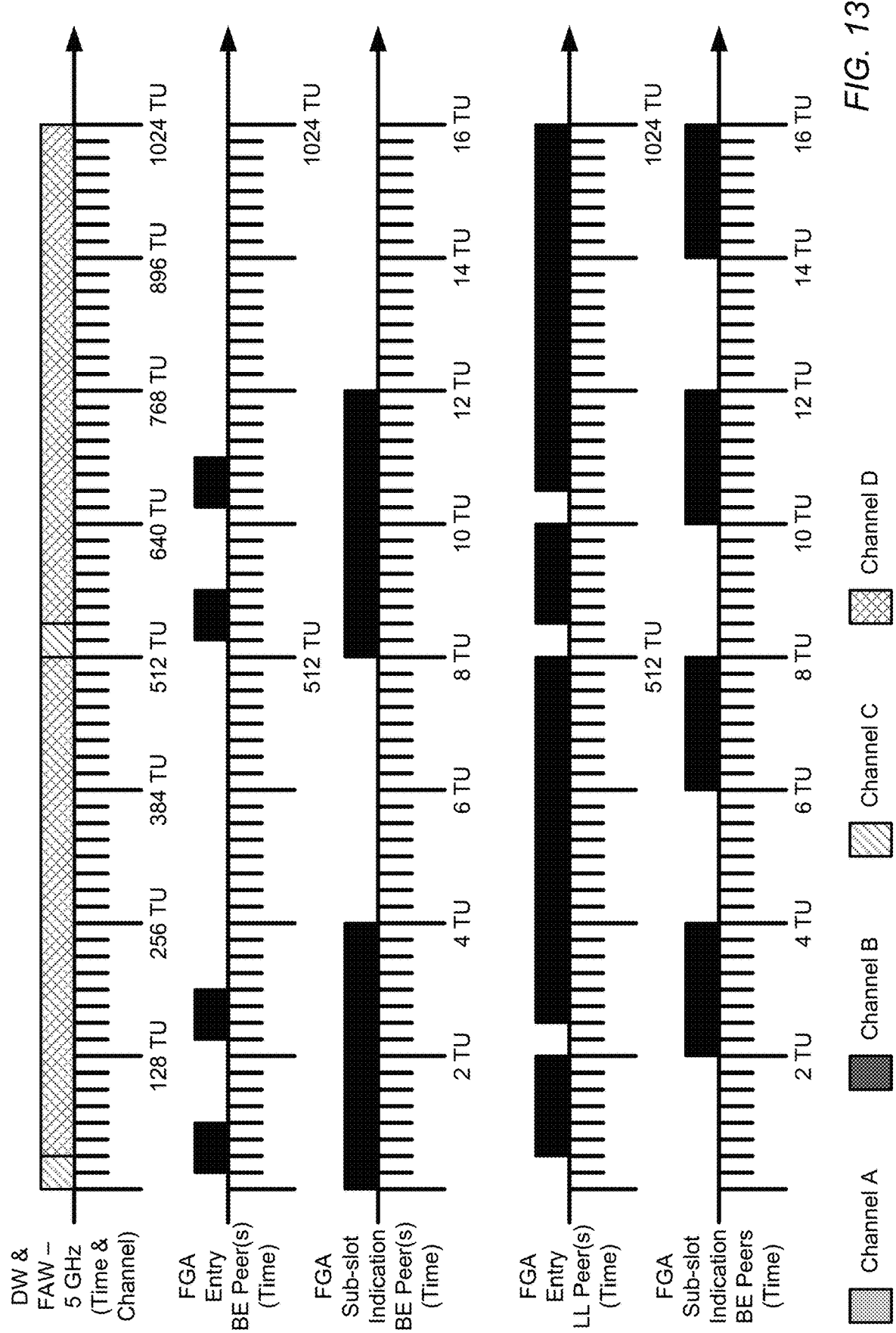
FIG. 13 illustrates an example of a fine-grained availability window schedule for supporting multiple types (or classes) of peer-to-peer communications, according to some embodiments.

Further, in some embodiments, a wireless device, such as client station 106, may transmit (and/or maintain) different FGA slot schedules to different devices and/or different sets of devices. For example, FIG. 13 illustrates an example of a fine-grained availability window schedule for supporting multiple types (or classes) of peer-to-peer communications, according to some embodiments. In some embodiments, the differing FGA slot schedules may allow the device to stagger transmission schedules for the different devices, avoid congestions at particular FGA sub-slots, and/or to provide quality of service (QoS)/latency guaranteed sub-slots to certain devices and/or sets of devices. For example, as illustrated by FIG. 13, the wireless device may transmit different FGA slot schedule indications (including sub-slot indications) to best effort peers and low latency peer(s).

Figure 14:
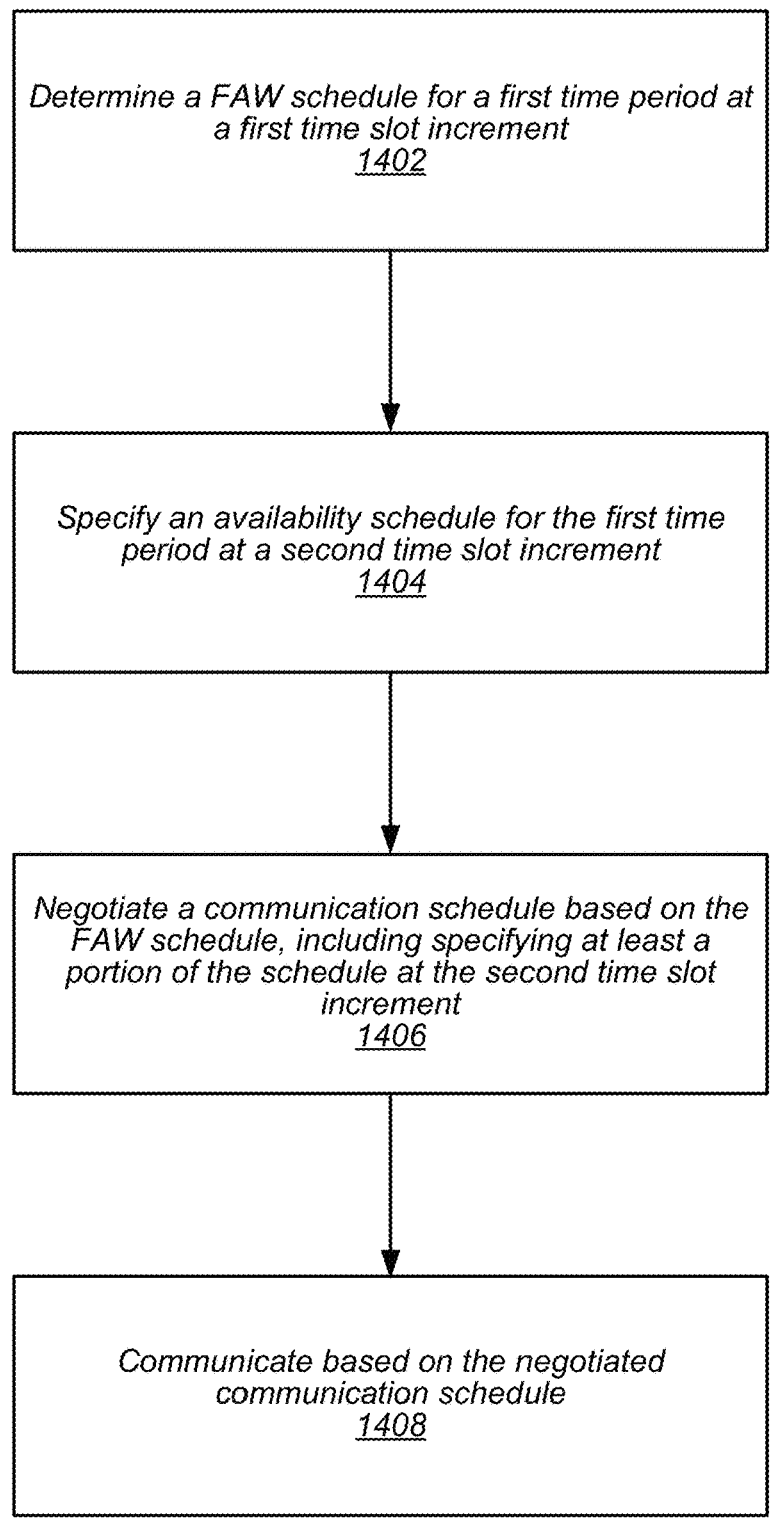
FIG. 14 illustrates a block diagram of an example of a method for specifying a fine-grained availability schedule, according to some embodiments While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

FIG. 14 illustrates a block diagram of an example of a method for specifying a fine-grained availability schedule, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a wireless device, such as client station 106, may determine a further availability window (FAW) schedule for one or more categories of peer-to-peer communications. The FAW schedule may specify a wireless device's availability in terms of both times and channels. In some embodiments, the FAW schedule may be a superset of other schedules, such as an immutable schedule, a public schedule, and/or a NAN data cluster (NDC) schedule. In some embodiments, the FAW schedule may be determined, based at least in part, on current peer-to-peer data connections (e.g., current and/or on-going peer-to-peer data exchanges/sessions). In some embodiments, the FAW schedule may be determined, based at least in part, on application requirements for a peer-to-peer data exchange, e.g., quality of service requirements (QoS) such as latency requirements.

In some embodiments, the FAW schedule may be determined for a first time period, including specifying availability for particular channels at particular time slots at a first time slot increment. In some embodiments, at least a portion of time slots specified at the first time slot increment may not be cancelable. In some embodiments, the FAW schedule may repeat, e.g., after the first time period. In some embodiments, the first time increment may include 16 time units. In some embodiments, a time unit may include 1.024 milliseconds. In some embodiments, the second time increment may include at least one of 1 time unit, 2 time units, 4 time units, and/or 8 time units.

At 1404, the wireless device may further specify availability at a second time slot interval for at least the first time period. In some embodiments, the availability at the second time slot interval may be specified, based at least in part, on latency requirements of a peer-to-peer communication application. In some embodiments, some or all of the availability specified at the second time slot interval may be cancellable. In other words, at least a portion of time slots specified at the second time slot increment may be cancelable. In some embodiments, if a time slot specified at the second time slot interval as cancellable overlaps a time slot specified at the first time slot interval as non-cancelable, the time slot specified at the second time slot interval may become non-cancelable as well. In other words, non-cancelability specified at the first time slot interval may override cancelability specified at the second time slot interval. In some embodiments, the availability at the second time slot increment may be for at least a subset of the time slots specified at the first time slot increment. In some embodiments, the second time slot increment may be less than the first slot time increment. In some embodiments, availability at the second time slot increment may include a series of time slots repeated in increments of the first time period. In such embodiments, time slots in the series of time slots may be specified in increments of the first time slot increment.

In some embodiments, a sub-slot availability of time slots specified using the second time slot increment may be indicated via a 2-bit indicator and/or indication (and/or bitmap). In some embodiments, each sub-slot may be 2 time units. In some embodiments, a value of 00 for the 2-bit indication may specify availability at a start of each sub-slot, a value of 01 for the 2-bit indication may specify availability at a start of every second sub-slot, a value of 10 for the 2-bit indication may specify availability at a start of every fourth sub-slot, and a value of 11 for the 2-bit indication may specify availability at a start of every eighth sub-slot.

In some embodiments, a sub-slot availability of time slots specified using the second time slot increment may be indicated via an 8-bit indicator and/or indication (and/or bitmap). In some embodiments, each bit may represent availability of a sub-slot, where a sub-slot may be 2 time units. In some embodiments, a value of 11111111 for the 8-bit indication may specify availability at a start of each sub-slot, a value of 01010101 for the 8-bit indication may specify availability at a start of every second sub-slot, a value of 00010001 for the 8-bit indication may specify availability at a start of every fourth sub-slot, and a value of 00000001 for the 8-bit indication may specify availability at a start of every eighth sub-slot. In some embodiments, a value of 11111100 for the 8-bit indicator may indicate that the wireless device intends to perform a channel switch and/or band/frequency switch prior to the start of a next time slot as specified at the first time slot increment.

In some embodiments, the wireless device may specify multiple sub-slot availabilities, e.g., based on a categorization of a peer-to-peer data communication session. For example, in some embodiments, the wireless device may specify a first sub-slot availability for a best effort peer-to-peer data communication session and a second sub-slot availability for a low latency peer-to-peer data communication session. In some embodiments, the sub-slot availabilities may differ at both the first time slot increment and the second time slot increment.

At 1406, the wireless device may negotiate, with at least a first neighboring wireless device, a peer-to-peer communication schedule for a peer-to-peer communication application based on the FAW schedule. The communication schedule may specify at least a portion of the peer-to-peer schedule using the second time slot increment. In some embodiments, at least a portion of time slots specified at the second time slot increment may not be scheduled for communication. In some embodiments, the wireless device may enter a sleep mode during such time slots. In some embodiments, the wireless device may switch channels and/or bands (frequencies) during such time slots (e.g., time slots not scheduled for communication). In some embodiments, the peer-to-peer communication application may specify and/or be associated with minimum and/or maximum latency requirements. In such embodiments, the peer-to-peer communication schedule may accommodate such requirements. In other words, the negotiated peer-to-peer communication schedule accommodates the latency requirement via scheduling of time-slots at the second time slot increment.

At 1408, the wireless device may communicate, with at least the first neighboring wireless device, according to the negotiated peer-to-peer communication schedule. In some embodiments, the wireless device may maintain multiple peer-to-peer data communication sessions with multiple neighboring wireless devices.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   one or more wireless interfaces in communication with the at least one antenna; and
   at least one processor in communication with the one or more wireless interfaces;
   wherein the at least one processor is configured to cause the wireless station to:
      determine, for one or more categories of peer-to-peer communications, a further availability window schedule for a first time period, including specifying availability for particular channels at particular time slots at a first time slot increment;
      specify, based at least in part on latency requirements of a peer-to-peer communication application, availability at a second time slot increment for at least a subset of the time slots specified at the first time slot increment, wherein the second time slot increment is less than the first time slot increment, and wherein at least a portion of time slots specified at the second time slot increment are cancelable;
      negotiate, with at least a first neighboring wireless station, a peer-to-peer communication schedule for the peer-to-peer communication application based on the further availability window schedule, including specifying at least a portion of the peer-to-peer schedule using the second time slot increment; and
      communicate, with at least the first neighboring wireless station, according to the negotiated peer-to-peer communication schedule.

2. The wireless station of claim 1,
   wherein the first time increment comprises 16 time units; and
   wherein the second time increment comprises at least one of:
      1 time unit;
      2 time units;
      4 time units; or
      8 time units.

3. The wireless station of claim 1,
   wherein at least a portion of time slots specified at the first time slot increment are not cancelable.

4. The wireless station of claim 1,
   wherein at least a portion of time slots specified at the second time slot increment are not scheduled for communication, wherein, during the portion of time slots not scheduled for communication, the at least one processor is further configured to cause the wireless station to:
switch channels or frequency bands.

5. The wireless station of claim 1,
wherein the at least one processor is further configured to cause the wireless station to:
exchange, at a start of a time slot specified at the second time slot increment, data with the first neighboring wireless station; and
enter a power saving mode of operation after the exchange of data and until a next data exchange opportunity.

6. The wireless station of claim 1,
wherein a sub-slot availability of time slots specified using the second time slot increment is indicated via a 2-bit indicator, wherein each sub-slot is 2 time units.

7. The wireless station of claim 6,
wherein a value of 00 for the 2-bit indication specifies availability at a start of each sub-slot;
wherein a value of 01 for the 2-bit indication specifies availability at a start of every second sub-slot;
wherein a value of 10 for the 2-bit indication specifies availability at a start of every fourth sub-slot; and
wherein a value of 11 for the 2-bit indication specifies availability at a start of every eighth sub-slot.

8. The wireless station of claim 1,
wherein a sub-slot availability of time slots specified using the second time slot increment is indicated via an 8-bit indicator, wherein each bit represents availability of a sub-slot, and wherein a sub-slot is 2 time units.

9. The wireless station of claim 1,
wherein availability at the second time slot increment includes a first availability schedule for a first category of communication and a second availability schedule for a second category of communication.

10. A non-transitory computer readable memory medium storing program instructions executable by processing circuitry of a wireless station to:
determine a further availability window schedule for a first time period at a first time slot increment, wherein the further availability window schedule specifies the wireless station's availability for peer-to-peer communications;
specify availability at a second time slot increment for at least a subset of the time slots specified at the first time slot increment, wherein the second time slot increment is less than the first time slot increment, and wherein at least a portion of time slots specified at the second time slot increment are cancelable;
negotiate, with at least a first neighboring wireless station, a peer-to-peer communication schedule for a peer-to-peer communication application based on the further availability window schedule, including specifying at least a portion of the peer-to-peer schedule using the second time slot increment; and
communicate, with at least the first neighboring wireless station, according to the negotiated peer-to-peer communication schedule.

11. The non-transitory computer readable memory medium of claim 10,
wherein further availability at the second time slot increment comprises a series of time slots repeated in increments of the first time period.

12. The non-transitory computer readable memory medium of claim 11,
wherein time slots in the series of time slots are specified in increments of the first time slot increment.

13. The non-transitory computer readable memory medium of claim 10,
wherein availability at the second time slot increment includes a first availability schedule for a first category of communication and a second availability schedule for a second category of communication.

14. The non-transitory computer readable memory medium of claim 13,
wherein the first category includes best effort communications, and wherein the second category includes low latency communications.

15. The non-transitory computer readable memory medium of claim 10,
wherein the peer-to-peer communication application has an associated latency requirement, and wherein the negotiated peer-to-peer communication schedule accommodates the latency requirement via scheduling of time-slots at the second time slot increment.

16. An apparatus, comprising:
a memory; and
at least one processor in communication with the memory, wherein the at least one processor is configured to:
determine a further availability window schedule for a first time period at a first time slot increment, wherein the further availability window schedule specifies availability for peer-to-peer communications;
specify availability at a second time slot increment for at least a subset of the time slots specified at the first time slot increment, wherein the second time slot increment is less than the first time slot increment, and wherein at least a portion of time slots specified at the second time slot increment are cancelable;
negotiate, with at least a first neighboring wireless station, a peer-to-peer communication schedule for a peer-to-peer communication application based on the further availability window schedule, including specifying at least a portion of the peer-to-peer schedule using the second time slot increment to accommodate channel and/or frequency band switches associated with the further availability schedule; and
communicate, with at least the first neighboring wireless station, according to the negotiated peer-to-peer communication schedule.

17. The apparatus of claim 16,
wherein the negotiated peer-to-peer communication schedule further accommodates a latency requirement associated with the peer-to-peer application via scheduling of time-slots at the second time slot increment.

18. The apparatus of claim 16,
wherein the first time increment comprises 16 time units; and
wherein the second time increment comprises at least one of:
1 time unit;
2 time units;
4 time units; or
8 time units.

19. The apparatus of claim 16,
wherein at least a first portion of time slots specified at the first time slot increment are not cancelable;
wherein at least a second portion of time slots specified at the second time slot increment are cancelable; and wherein, when the first portion of time slots overlap the second portion of time slots, overlapping time slots of the second portion become non-cancelable.

20. The apparatus of claim 16, wherein a sub-slot availability of time slots specified using the second time slot increment is indicated via a 2-bit indicator.

* * * * *